UNITED STATES PATENT OFFICE.

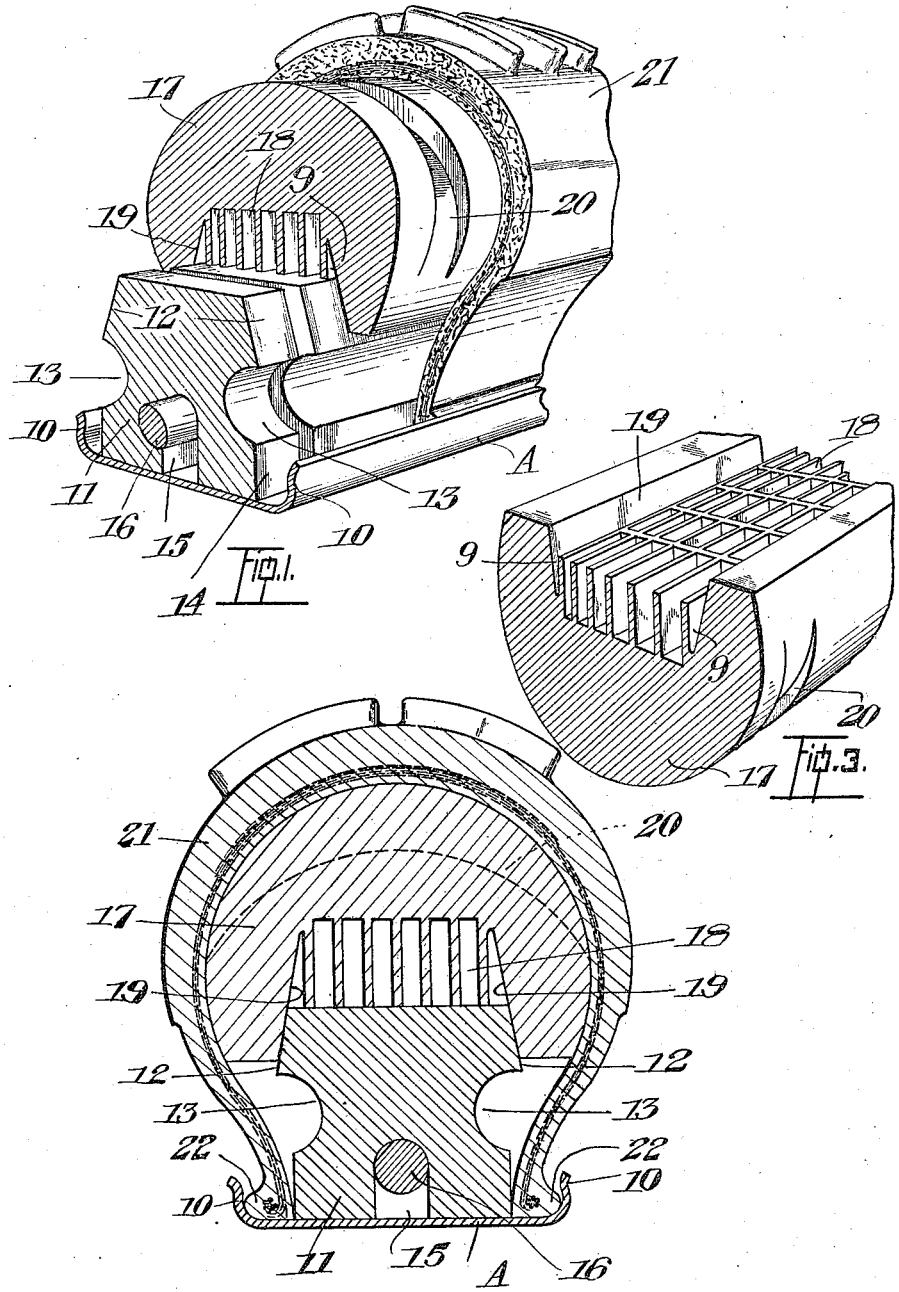

HENRY ALBERT HUBER, OF OTTAWA, ONTARIO, CANADA.

TIRE.

1,262,953. Specification of Letters Patent. Patented Apr. 16, 1918.

Application filed June 28, 1917. Serial No. 177,577.

*To all whom it may concern:*

Be it known that I, HENRY ALBERT HUBER, a subject of the King of Great Britain, and residing at 12 Melgund avenue, in the city of Ottawa, Province of Ontario, Dominion of Canada, have invented certain new and useful Improvements in Tires, of which the following is a specification.

This invention relates to improvements in cushion tires, particularly designed for use on automobiles and like vehicles and the objects of the invention are to entirely overcome the drawbacks of puncture, to permit of the tires having a resiliency equal to that of a pneumatic tire, to reduce the number of parts and so render the tire easily assembled and positioned on a wheel rim with a minimum of time and labor, and generally to adapt the several parts to better perform the functions required of them.

With the above and other objects in view, the invention consists essentially of the improved construction particularly described and set forth in the following specification and accompanying drawings forming part of the same.

In the drawings:

Figure 1 is a fragmentary perspective view of the improved tire, showing the location of the several parts.

Fig. 2 is a transverse section of the improved tire.

Fig. 3 is a fragmentary perspective view of the inner core of the tire showing the air pockets therein.

Like characters of reference refer to like parts in the several figures.

Referring to the drawings, A represents a wheel rim of any usual construction generally used in automobile practice, being provided with lateral flanges 10 between which the base 11 is located. This base is made in sections built up of strips of material if such is found desirable.

These base sections are provided on their outer ends with tapering lateral walls 12 below which curvilinear recesses 13 are located, the inner side walls 14 being then formed parallel as shown in Figs. 1 and 2.

The sections of the base 11 are provided on the inner ends with recesses 15 within which the resilient ring 16 is designed to engage and press the sections of the base radially outwardly in a manner to be made clear hereinafter.

A core 17 of rubber or like resilient material provided with an inner peripheral recess 9 fits over the base 11, and this core is provided in the said recess with a plurality of pockets 18, the open ends of which intimately engage with the outer wall of the base 11 so that the air in each of the pockets cannot escape.

The lateral walls 19 of the recess 9 containing the pockets 18 are angularly disposed and project beyond the ends of the pockets, so that while the said pockets engage with the outer wall of the base 11, the walls 19 will intimately engage with the tapering side walls 12 of the base.

The core 17 is provided on the outer wall with a plurality of equidistantly spaced curvilinear recesses 20 which besides lightening the core permit of its assuming the desired curvature of the rim A on which the tire is mounted, and furthermore cheapen the cost of construction of the same.

The core 17 is inclosed by a shoe 21 of any usual construction provided with the beading 22 adapted to engage with the flanges 10 of the rim A, as is usual in automobile practice.

When the tire is being assembled, the core 17 is positioned within the outer shoe 21 and the sections of the base 11 are positioned within the recess 9, then the resilient ring 16 is sprung into position within the recesses 15, so holding the several sections of the base 11 in position prior to placing on the demountable rim A.

When this rim A is mounted on an automobile wheel and is in use, that portion of the shoe in contact with the road and on which pressure is exerted, will become slightly flattened thereby compressing the air in the pockets 18 and as this air cannot escape from the said pockets the desired resiliency is thus obtained.

This pressure on the tire causes the inner ends of the pockets 18 to more closely engage with the outer wall of the base 11, and at the same time the beveled walls 19 more intimately engage the tapered walls 12 of the base.

By referring to Fig. 2, it will be seen that the curvilinear recesses 13 in the base 11 form with the inner wall of the shoe 21, air pockets on each side of the base and when pressure is brought to bear on the tire the air in these pockets is compressed and so prevents the sides of the shoe collapsing, and the beading 22 is then pressed tightly into engagement with the flanges 10 of the rim A and so prevent the outer shoe from becoming displaced.

From this description it will be seen that I have invented a core adaptable to any type of shoe at present on the market, the tire being punctureless but possessing a resiliency equal to that of an ordinary pneumatic tire, while the inner core will not deteriorate or become worn out due to use under ordinary conditions, the several parts being easily assembled and accessible for inspection.

As many changes could be made in the above constructions, and many apparently widely different embodiments of my invention within the scope of the claims, without departing from the spirit or scope thereof, it is intended that all matter contained in the above specification and accompanying drawings shall be interpreted as illustrative and not in a limiting sense.

What I claim as my invention is:

1. A tire comprising a base formed of a plurality of sections, having the side walls tapering, a core having an inner peripheral recess with angular lateral walls engaging the tapering walls of the base and a shoe embracing the core and base.

2. A tire comprising a base having the side walls tapering and provided with recesses intermediate of the height of the base, a core having an inner peripheral recess provided with angularly disposed lateral walls co-acting with the tapering walls of the base, the core having a plurality of peripheral recesses in the outer wall and a shoe embracing the core and the base.

3. A tire comprising a base having the side walls tapering and provided with a recess in the inner wall, resilient means located in the recess, a core having a plurality of air pockets located adjacent to the outer wall of the base and a shoe embracing the core and the base.

4. A tire comprising a base formed of a plurality of sections having the side walls tapering, resilient means for pressing the sections of the base radially outwardly, a core having a peripheral recess in the inner wall co-acting with the tapering walls of the base and a shoe embracing the core and the base.

5. A tire comprising a base having the side walls tapering, a core having a peripheral recess in the inner wall provided with angularly disposed lateral walls co-acting with the tapering walls of the base, a plurality of air pockets in the recess and a shoe embracing the core and the base.

6. The combination with a demountable rim, a tire comprising a base, a core having a plurality of pockets in the inner wall co-acting with the base, and a shoe engaging the rim and inclosing the core and the base and forming therewith air pockets located on opposite sides of the base.

7. A tire comprising a base, a core having a plurality of pockets engaging the base and forming therewith air tight compartments and having a plurality of equidistantly spaced curvilinear peripheral recesses in the outer wall, a shoe surrounding the base and core and a ring designed to primarily press the base into contact with the core.

In witness whereof I have hereunto set my hand.

HENRY ALBERT HUBER.

Copies of this patent may be obtained for five cents each, by addressing the "Commissioner of Patents, Washington, D. C."